Aug. 2, 1966 J. T. McNANEY 3,263,921
BINARY TO DECIMAL CONVERTER
Filed July 30, 1965
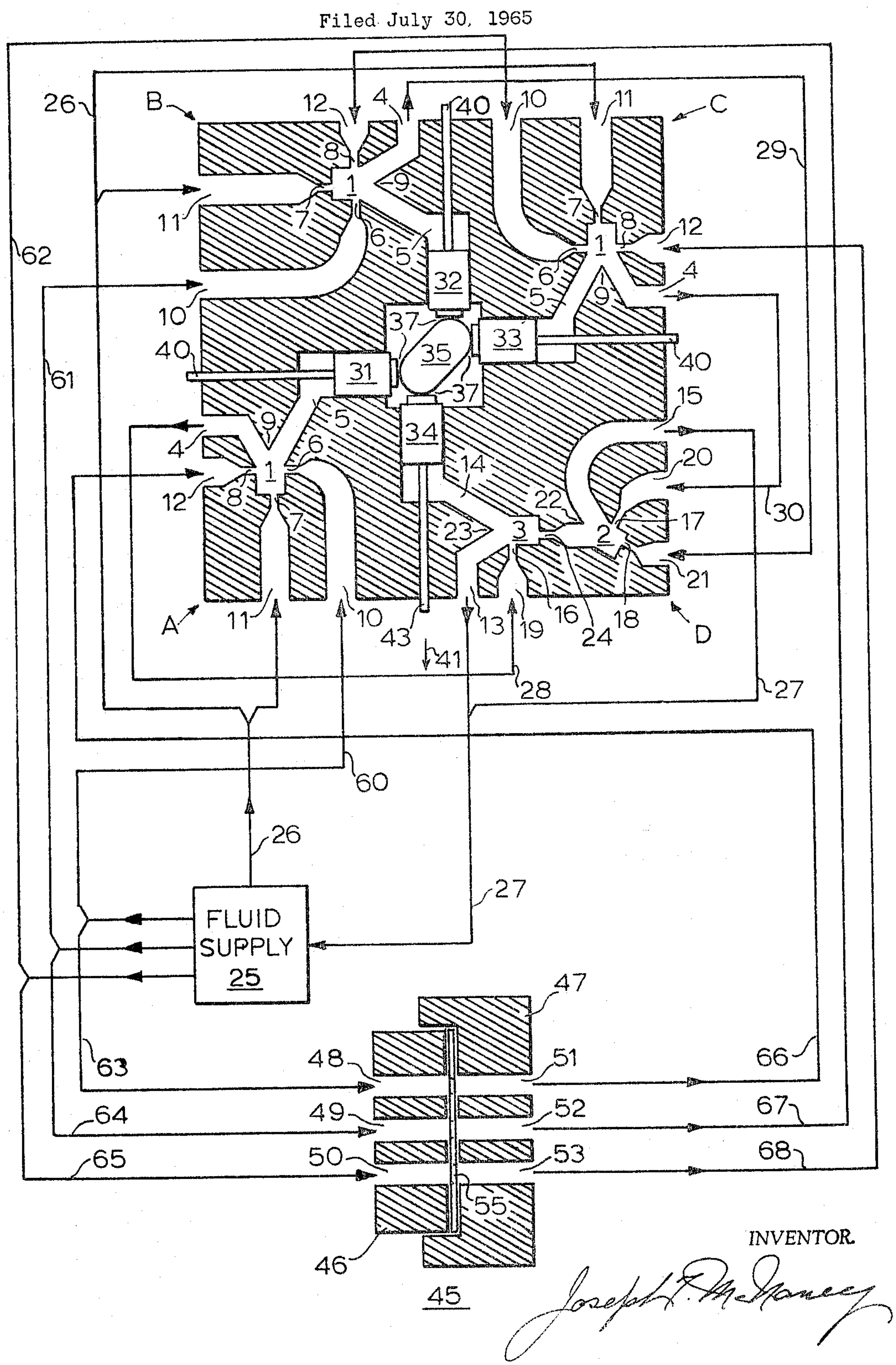
INVENTOR.
Joseph T. McNaney United States Patent Office 3,263,921
Patented August 2, 1966

3,263,921
BINARY TO DECIMAL CONVERTER

Joseph T. McNaney, 8548 Boulder Drive, La Mesa, Calif.
Filed July 30, 1965, Ser. No. 476,016
4 Claims. (Cl. 235—201)

This invention relates to apparatus for converting binary code related input data to decimalized output functions and more particularly to apparatus of this type utilizing novel fluid amplifier means for improving the operating speeds thereof.

The binary to decimal converter means of this invention is of the type shown and described in my U.S. Patents Nos. 3,101,233 and 3,191,167, and in combination with fluid amplifier means, in effecting input displacement-control and displacement-return functions, it is an object of the present invention to provide a converter means of this type that is not only capable of reliable high operating speeds, but also insensitive to temperature and radiation environmental conditions.

Other objects and features of my invention will be readily apparent to those skilled in the arts from the following specification and appended claims illustrating certain preferred embodiment of this invention, and from the accompanying drawing.

Referring now to the drawing, actuation of the binary to decimal converter mechanism of this invention is under the control of first, second and third input displacement-control fluid amplifiers A, B and C, and a displacement-return fluid amplifier D. In the following description of these amplifiers it will be noted that the input amplifiers A, B and C are essentially alike and, therefore, similar parts thereof are identified by similar identifying numbers. The operating principles of such amplifiers are well known in the art; each includes a centralized chamber 1 formed by intersections of the various output channels and orifices associated therewith. The displacement-return amplifier D includes first and second series connected centralized chambers 2 and 3, which are also formed by their various output and fluid return channels, and orifices.

Each centralized chamber 1 has two output channels 4 and 5, and three flow control orifices 6, 7 and 8 supplied with fluid from input channels 10, 11 and 12. A dividing element 9 is shown offset from the orifice 7 so that a stream of fluid entering the chamber 1 through the orifice 7 normally strikes a side of the element 9 adjacent the output channel 5. The displacement-return amplifier D has an output channel 14, fluid return channels 13 and 15, and three flow control orifices 16, 17 and 18 supplied with fluid from input channels 19, 20 and 21, respectively. A dividing element 22 of chamber 2 is offset from the orifice 18 so that a stream of fluid entering chamber 2 from the orifice 18 normally strikes a side of the element 22 adjacent the fluid return channel 15, and a dividing element 23 of chamber 3 is offset from the orifice 24 so that a stream of fluid entering chamber 3 from the orifice 24 normally strikes a side of the element 23 adjacent the output channel 13.

Fluid under pressure from a fluid supply 25 will flow through an interconnecting duct 26 to the input channels 11 of each of the displacement-control amplifiers A, B and C, and fluid will return to the supply 25 from return channels 13 and 15 through an interconnecting duct 27. Fluid from the output channel 4 of the first amplifier A will flow through an interconnecting duct 28 to the input channel 19. Fluid from the output channel 4 of the second amplifier B will flow through an interconnecting duct 29 to the input channel 21. And fluid from the output channel 4 of the third amplifier C will flow through an interconnecting duct 30 to the input channel 20.

The converter mechanism of this invention as illustrated is shown to include four fluid-displaceable members 31, 32, 33 and 34 and a coupling mechanism 35 resting against the four members at four independent points of contact 37. Each of the members 31 to 34 are in the form of a piston capable of being moved in the direction of the coupling means 35 under the influence of fluid pressure through their respective and interconnecting channels 5 and 14.

In the foregoing discussion the amplifiers A, B, C and D have been referred to as fluid amplifiers and supplied with fluid under pressure from the source 25. The fluid, of course, may be in the form of a gas, or air, or a liquid, and it is usually air.

In view of the description given thus far of the invention, fluid under pressure entering the channels 11 of the first, second and third amplifiers will, by means of the dividing element 9, reach each of the pistons 31, 32 and 33, displacing them in the direction of the coupling means 35. Displacement limiting means (not shown) may be attached to each of the piston rods, or shafts 40. Such limiting means is for the purpose of controlling the stroke of each piston to the extent of relating it to the value of a binary coded input signal, as described in the above Patents 3,101,233 and 3,191,167.

Upon entering each channel 11 and then the orifice 7, the fluid in the form of a power stream emerges from the orifice 7, and enters the chamber 1 as a high velocity jet stream. Unless deflected, and as indicated, the increased pressure in channel 5 will effect a predetermined displacement of the piston associated therewith, resulting in a corresponding reorientation of the coupling mechanism 35 and displacement of the output member 34. The member 34 will therefore be displaced in the direction of the arrow 41, and against a restraining force, or output load, (not shown). Examples of utilizing such member 34 displacements are also described in the above U.S. patents. The restraining force may be a spring adjacent the extreme end of the piston 34, rod 43, and primarily for the purpose of maintaining the mechanical contact between the coupling mechanism 35 and the members 31 to 34 at their respective contact points 37.

As set forth in my U.S. Patents 3,101,233 and 3,191,167 the output member 34 can be displaced, with respect to a zero reference position, to seven different positions in response to seven different combinations of displacements imparted to the input members 31, 32 and 33, with respect to the zero reference position. In the present invention these displacements will be under the control of the first, second and third amplifier input signal means, which includes a perforated tape transport means 45, designed to control the fluid switching means of the amplifiers A, B and C.

The transport 45 is shown to have a first fluid channel member 46 and a second fluid channel member 47. The first member 46 contains three tubulations 48, 49 and 50, and the second member 47 contains an equal number of tubulations 51, 52 and 53; the tubulations 48, 49 and 50 of the one member being aligned, respectively, with the tubulations 51, 52 and 53 of the other member so that fluid may flow therethrough from the one member to the other. Intermediate the two members 46 and 47 the end view 55 of a perforated tape, for example, is illustrated as though movable toward or away from the viewer. Such tapes are well known in the art and in this invention the tape 55 will contain openings therein that may be aligned with the tubulations as it travels between the two members 46 and 47. The tape 55 will therefore block the passage of fluid through interconnecting tubulations, or openings therein will permit, selectively, the passage of fluid therethrough. And in each instance the openings therein will correspond to a one-, two- or three-bit code.

A source of fluid, under pressure, is supplied through separate ducts 60, 61 and 62 to signal inlets 10 of the amplifiers A, B and C, and these ducts 60, 61 and 62 are connected with tubulations 48, 49 and 50, respectively, through ducts 63, 64 and 65. The ducts 66, 67 and 68 interconnect the tubulations 51, 52 and 53, respectively, with signal inlets 12 of the amplifiers A, B and C. Assuming the tape 55 is in a position to block the passage of fluid from the source 25 from the tubulations 48–50 to the tubulations 51–53, a predetermined fluid pressure will be provided in the signal inlets 10, however, when an opening in the tape 55 is aligned with one or more of the tubulation intersections, the predetermined fluid pressure will be extended therethrough to the signal inlets 12, and in this event a flow of fluid through an inlet 10 and its associated orifice 6 will be interrupted.

When there are no tape openings at the tubulation intersections a jet stream will emerge from each of the orifices 6 of amplifiers A, B and C, and in doing so will deflect the power stream, issuing from the orifice 7, from one side of the dividing element 9 to the other, thereby allowing the power stream to enter channels 4. The power stream from channel 4 of amplifier A will be conveyed to the input channel 19 of amplifier D; and from channel 4 of amplifier B to input channel 21 of amplifier D; and from channel 4 of amplifier C to input channel 20 of the amplifier D. Under these conditions fluid under pressure will issue from the orifies 16, 17 and 18 of the amplifier D. The fluid emerging from the orifice 18 would normally enter the channel 15 returning it to the supply 25, however, a jet stream issuing from the orifice 17 will deflect it toward the orifice 24. Then, fluid emerging from the orifice 24 would normally enter the channel 13 returning it to the supply 25, however, a jet stream issuing from the orifice 16 will deflect it toward the channel 14 and therethrough to the piston 34. The data converter of the invention will be in, what may be referred to as, a zero reference position.

From the foregoing discussion it will be learned that it is necessary for fluid from the amplifiers A, B and C to enter the channels 19, 20 and 21 simultaneously in order to provide a power stream in the channel 14 and thereby effect a displacement of the piston 34 in the direction of the coupling means 35. For example, a power stream issuing from the orifice 18 will be returned directly through the channel 15 to the supply 25, unless deflected by a stream of fluid from the orifice 17; or, a power stream issuing from the orifice 24 will be returned directly through the channel 13 to the supply 25, unless deflected by a stream of fluid from the orifice 16; or, fluid from the orifices 16 and 17, in the absence of a power stream from the orifice 18, will not provide the piston 34 displacement-return requirements of the invention. To obtain the highest operating speeds possible, following each input function the amplifier D is provided to effect a rapid return to the reference position of the displaced pistons.

Upon the application of a displacement signal to the first amplifier A, fluid flow through duct 28 to channel 19 will be interrupted; upon the application of a displacement signal to the second amplifier B, fluid flow through duct 29 to channel 21 will be interrupted; and upon the application of a displacement signal to the third amplifier C, fluid flow through duct 30 to channel 20 will be interrupted. In each case the output force of the amplifier D will have been interrupted. Such interruptions of the force from amplifier D will permit the converter displacements to be made without having to overcome this force in the process. And following each input function to the converter of this invention, the displacement-return power of the amplifier D is again utilized to return the converter to its reference position at a speed greater than the return speed that might be provided by the continuously applied restraining force adjacent the rod 43, as hereinbefore stated.

Although it may not be necessary to apply signal forces through ducts 66, 67 and 68 to orifices 8, respectively, of amplifiers A, B and C, it has been found that the response characteristics of the invention are faster than it would be if the tubulations 51, 52 and 53 are merely left open to ambient air. However, it should be understood that the invention is operable without this feature, since the admission of ambient air to the tubulations 48, 49 and 50 will effect an interruption of a jet stream issuing from orifices 6, whereby a power stream from orifices 7 will enter channels 5. But the invention as set forth is more efficient.

It should be understood that many of the other embodiments embracing the basic concepts and constructions hereinbefore set forth may be utilized and still be within the ambit of the present invention. The particular embodiment illustrated and described herein is illustrative only and the invention includes other dimensions and equivalents as may readily appear to those skilled in the arts and within the scope of the appended claims.

I claim:

1. The combination comprising:

(a) at least first, second and third fluid amplifiers, each having first and second output channels, and first and second signal inlets through which fluid signals may be applied to selectively switch its power stream between said first and second output channels;

(b) an additional fluid amplifier, having an output channel, and first, second and third signal inlets through which fluid is applied, respectively, from the first output channel of said first, second and third amplifiers;

(c) a coupling mechanism presenting at least four bearing surfaces;

(d) first, second and third fluid-displaceable members, each presenting a bearing surface for contacting a bearing surface of said mechanism, with fluid conveying means interconnecting said members, respectively, with the second output channel of said first, second and third amplifiers;

(e) an output fluid-displaceable member, presenting a bearing surface for contacting a bearing surface of said mechanism, with fluid conveying means interconnecting the output channel of said additional amplifier therewith;

(f) means for applying a fluid power stream to said first, second and third amplifiers;

(g) first, second and third amplifier input signal means;

(h) means for extending the influence of said power stream to said output fluid-displaceable member upon the application of signals from said input signal means, simultaneously, to the first signal inlet of said first, second and third amplifiers; and (i) means for interrupting said influence upon interrupting the application of said signals to either one, two or all of said first signal inlets of the first, second and third amplifiers thereby switching said power stream from the first output channel to the second output channel thereof.

2. The combination comprising:

(a) at least first, second and third fluid amplifiers, each having first and second output channels, and at least one signal inlet through which fluid signals are applied to selectively switch its power stream between said first and second output channels;

(b) an additional fluid amplifier, having an output channel, and first, second and third fluid inlets with means through which fluid is conveyed thereto, respectively, from the first output channel of said first, second and third amplifiers;

(c) a coupling mechanism presenting at least four bearing surfaces;

(d) first, second and third fluid-displaceable members, each presenting a bearing surface for contacting a bearing surface of said mechanism, with fluid conveying means interconnecting said members, respectively, with the second output channel of said first, second and third amplifiers;

(e) an output fluid-displaceable member, presenting a bearing surface for contacting a bearing surface of said mechanism, with fluid conveying means interconnecting said output channel of the additional amplifier therewith;

(f) means for applying a fluid power stream to said first, second and third amplifiers;

(g) means for directing said power stream to said second output channel of the first, second and third amplifiers;

(h) input signal means coupled to said signal inlets for selectively deflecting said power stream from said second to said first output channels, and upon deflection of said power stream, simultaneously, to the first output channel of said first, second and third amplifiers, extend the influence of said power stream to said output fluid-displaceable member; and (i) upon interrupting the deflection of said power stream to either one, two, or all of said first output channels the influence of said power stream extended to said output fluid-displaceable member will be interrupted.

3. The invention as set forth in claim 1 additionally including:

(j) means for switching input signals to said second inlet of the first, second and third amplifiers, thereby interrupting the application of input signals to the first inlet thereof and switching said power stream from first to said second output channels.

4 The invention as set forth in claim 1 additionally including:

(j) record means having predetermined data related openings therein;

(k) a source of fluid connected directly to each of the first signal inlets of said first, second and third amplifiers and the second signal inlets thereof connected, respectively, to said first signal inlets through the openings in said record means.

No references cited.

RICHARD B. WILKINSON, *Primary Examiner.*